United States Patent [19]
Rose et al.

[11] Patent Number: 5,835,899
[45] Date of Patent: Nov. 10, 1998

[54] SYSTEM AND METHOD FOR DERIVING FINANCIAL RESPONSIBILITY IDENTIFICATION

[75] Inventors: Sandra T. Rose, McKinney; John Elstrod, Plano; Patricia C. Andrews, Plano; Charles G. Forbes, Plano; Joseph M. Donovan, McKinney; Lynn M. Klinger, Plano, all of Tex.

[73] Assignee: Electronic Data Systems Corporation, Plano, Tex.

[21] Appl. No.: 609,694

[22] Filed: Mar. 1, 1996

[51] Int. Cl.$^6$ .................................................. G06F 17/60
[52] U.S. Cl. ................................................ 705/34; 705/30
[58] Field of Search .................................. 235/375, 379, 235/382; 705/1, 30, 34, 400

[56] References Cited

U.S. PATENT DOCUMENTS

| | | | |
|---|---|---|---|
| 4,511,793 | 4/1985 | Racanelli ................................. | 705/404 |
| 4,713,761 | 12/1987 | Sharpe et al. ............................. | 705/30 |
| 4,959,795 | 9/1990 | Christensen et al. .................... | 705/407 |
| 5,117,356 | 5/1992 | Marks ....................................... | 705/30 |
| 5,202,989 | 4/1993 | Hirosawa et al. ....................... | 395/650 |
| 5,383,129 | 1/1995 | Farrell ..................................... | 705/400 |
| 5,412,575 | 5/1995 | Constant et al. ........................ | 705/400 |
| 5,438,356 | 8/1995 | Ushiki et al. ............................. | 348/12 |
| 5,481,463 | 1/1996 | Constant et al. ........................ | 705/400 |
| 5,581,463 | 12/1996 | Constant et al. ........................ | 705/400 |
| 5,629,980 | 5/1997 | Stefik et al. ............................. | 380/4 |
| 5,634,012 | 5/1997 | Stefik et al. ............................. | 705/39 |
| 5,696,906 | 12/1997 | Peters et al. ............................. | 705/34 |
| 5,745,883 | 4/1998 | Krist et al. .............................. | 705/34 |

OTHER PUBLICATIONS

IBM Technical Disclosure Bulletin, vol. 17, No. 4, to Fischbeck et al., entitled "Comprehensive Computer Accounting System", dated Sep. 1974.

IBM Technical Disclosure Bulletin, vol. 37, No. 1, to Anonymous, entitled "Method for Gathering Accounting Data on Active Resources", dated Jan., 1994.

*Primary Examiner*—Edward R. Cosimano
*Attorney, Agent, or Firm*—T. Murray Smith; L. Joy Griebenow

[57] ABSTRACT

A system and method (10) for deriving access codes for billing customers includes a load process (12) receiving a set of system attributes (20) and using at least one of the system attributes (20) for looking up in at least one lookup table (16, 18, 22, 24) for an access code and at least one formula value, and further storing the access code and at least one formula value in an access code lookup table (26, 28). The system (10) further includes a derivation process (14) which receives a specification of values for the set of system attributes from a billing record (30), uses the specification of values for looking up in the at least one lookup table (16, 18, 22, 24) for a derivation formula, uses the derivation formula for looking up in the billing record (30) for an attribute value, and further uses the attribute value for comparing with the formula value stored in the access code lookup table (26, 28). The access code associated with the formula value comparable to the attribute value is the derived access code.

32 Claims, 6 Drawing Sheets

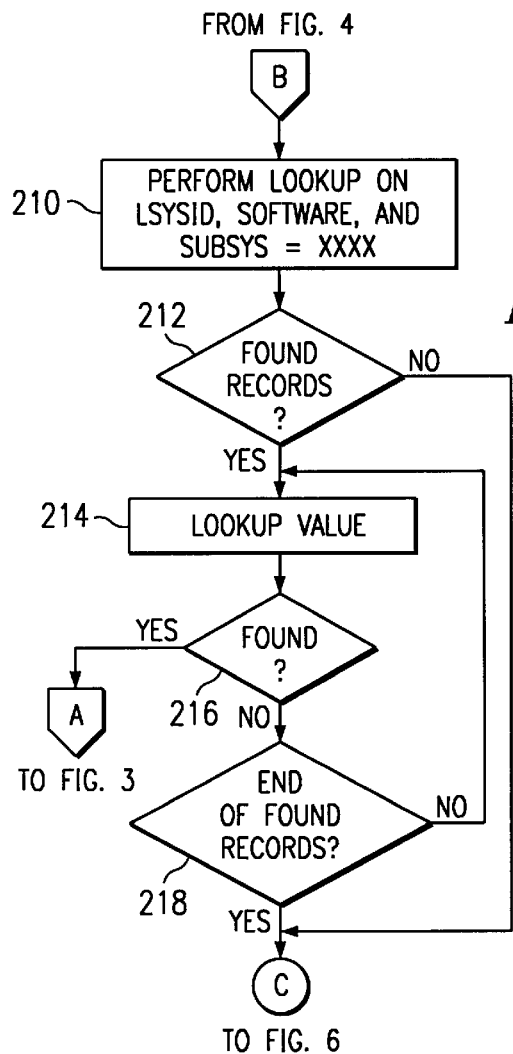
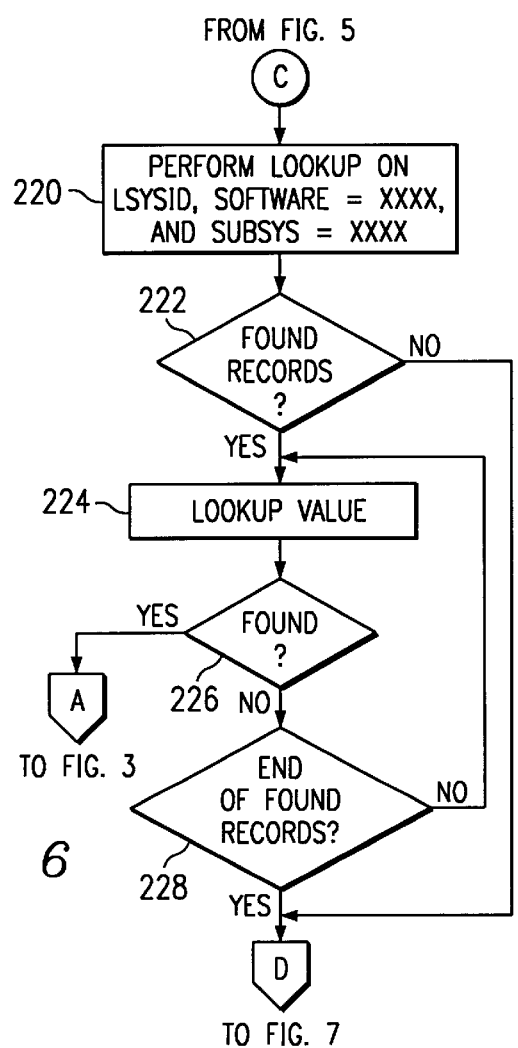
FIG. 5
FIG. 6

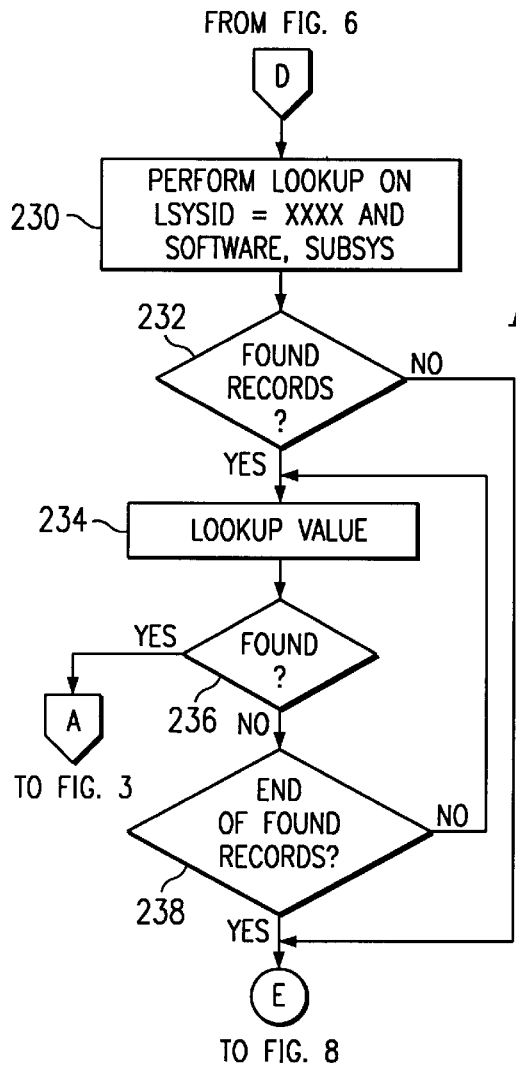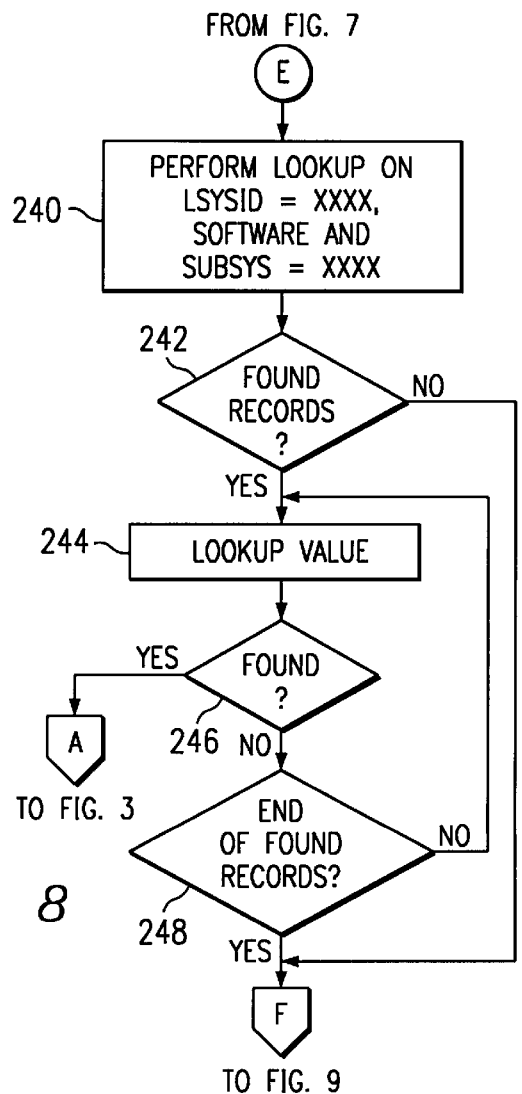

SYSTEM AND METHOD FOR DERIVING FINANCIAL RESPONSIBILITY IDENTIFICATION

TECHNICAL FIELD OF THE INVENTION

This invention is related in general to the field of information processing. More particularly, the invention is related to a system and method for deriving financial responsibility identification.

BACKGROUND OF THE INVENTION

For companies that provide information handling services in the way of computing and data processing to customers, means must be provided to access the data processing and computing costs in order to accurately allocate those costs to the customer accounts. This practice is known as "internal charge-back." In many instances, information handling services are provided by operating vast distributed programs on more than one computer, which are often located remotely from one another. Moreover, some companies that operate globally, the business units and their associated computer systems may be located in different parts of the world.

Generally, the information handling systems used for providing computing and data processing to customers includes a method or facility for recording system usage information. However, in normal operations the usage information is not directly associated with specific jobs or unit of work and their access codes. To obtain the specific cost allocation for internal charge-back to a particular customer, the system usage information has to be correlated to the customer and to the access code associated therewith. Under prior systems, obtaining an accurate and timely cost allocation was particularly difficult as the information handling systems did not allocate the usage information to specific customer and the customer jobs or unit of work were often run on a plurality of information handling systems located at various remote sites. Also, the task of performing complete cost allocation for all customer jobs or units of work was made more difficult due to the large number of customer jobs or unit of work that are performed by service providers and the unavailability of automated methods for collecting the usage information and allocating it to the specific customer. Traditional methods have also been inflexible and not permit each computing and information handling site the ability to identify unique criteria associated with the job or unit of work as a basis for determining access codes. This flexibility is especially important for any globally operating corporation that has diverse and remotely located operating centers that may have unique data processing requirements and special billing processes.

SUMMARY OF THE INVENTION

Therefore, a need has arisen for a system for deriving job access codes that overcomes the disadvantages and deficiencies of the prior art by meeting the need to assign access codes with the flexibility to specify unique criteria for assigning access codes.

In accordance with the present invention, such a system and a method for doing the same are provided which eliminate or substantially reduce the disadvantages associated with prior systems.

In one aspect of the invention, a system for deriving financial responsibility identification includes a load process receiving a set of system attributes and using at least one of the system attributes for looking up in at least one lookup table for an access code and at least one formula value, and further storing the access code and at least one formula value in an access code lookup table. The system further includes a derivation process which receives a specification of values for the set of system attributes from a billing record, uses the specification of values for looking up in the at least one lookup table for a derivation formula, uses the derivation formula for looking up in the billing record for an attribute value, and further uses the attribute value for comparing with the formula value stored in the access code lookup table. The access code associated with the formula value comparable to the attribute value is the derived access code.

In yet another aspect of the invention, a method for deriving access codes for billing the customer includes the steps of first receiving a set of system attributes and using at least one of the system attributes for looking up in at least one lookup table for an access code and at least one formula value, and then storing the access code and at least one formula value in an access code lookup table. A subsequent step then receives a specification of values for the set of system attributes from a billing record, which is then used for looking up in the at least one lookup table for a derivation formula. The derivation formula is then used for looking up in the billing record for an attribute value, which is compared with the formula value stored in the access code lookup table. The access code associated with the formula value comparable to the attribute value is the derived access code.

BRIEF DESCRIPTION OF THE DRAWINGS

For a better understanding of the present invention, reference may be made to the accompanying drawings, in which:

FIG. 5 is a simplified flowchart providing details on a lookup process;

FIG. 6 is a simplified flowchart providing details on a lookup process;

FIG. 7 is a simplified flowchart providing details on a lookup process;

FIG. 8 is a simplified flowchart providing details on a lookup process;

DETAILED DESCRIPTION OF THE INVENTION

Figure 1:
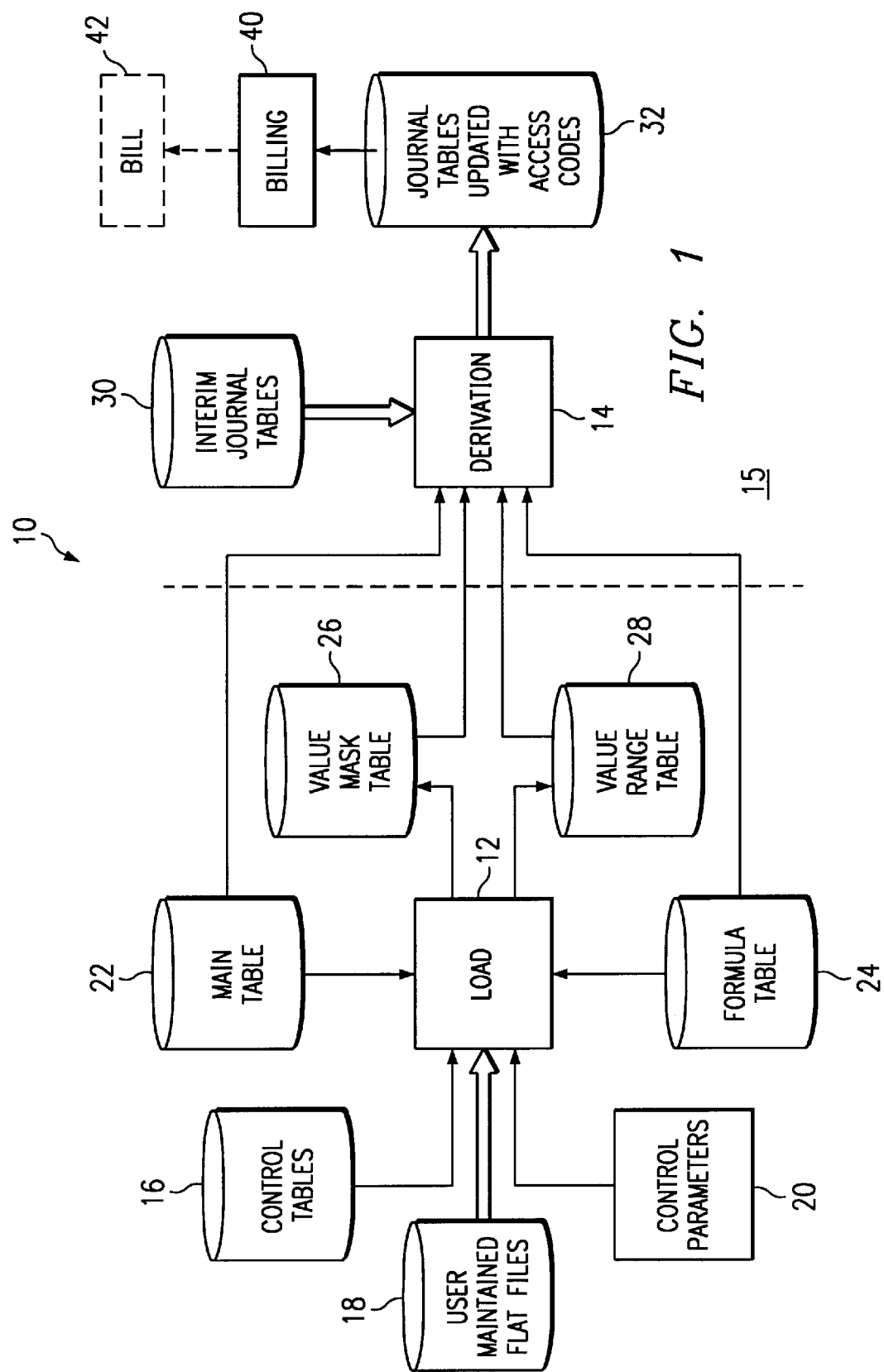
FIG. 1 is a simplified block diagram of an embodiment of the system and method for deriving access codes constructed according to the teachings of the present invention.

The preferred embodiment(s) of the present invention is (are) illustrated in FIGS. 1–10, like reference numerals being used to refer to like and corresponding parts of the various drawings.

Referring to FIG. 1, a system and method for deriving job access codes are indicated generally at 10 and constructed according to the teachings of the present invention. System 10 includes two primary processes or subsystems, a load process or subsystem 12 and a derivation process or subsystem 14. A primary function of load process 12 is to consolidate all the data and control parameters for derivation process 14 to derive or determine the access code for each job. Load process 12 and derivation process 14 are two separate processes which are generally independently run. For example, load process 12 may execute on demand and derivation process 14 may execute as part of a large accounting system 15, which is typically run on a scheduled periodic basis.

Load process 12 receives a number of inputs, including control tables 16, user-maintained flat files 18, and control parameters 20. Control parameters 20 is a set of system attributes or information that a user may use to identify which records in user-maintained flat files 18 are to be used in access code load process 12. User-maintained flat files 18 contain derivation search values and associated access codes. Control tables 16 includes information about the records in user-maintained flat files 18, including the type of records, and the offset and length of the fields in each record. Control tables 16, control parameters 20, and user-maintained flat files 18 are generally entered by users via a user interface (not shown), and may be accessed and modified in this manner. Load process 12 also receives data stored in two tables, main table 22 and formula table 24, in order to populate two other tables, value mask table 26 and value range table 28. Tables 22–28 may be stored and maintained in relational databases, such as DB2. Data from user-maintained flat files 18 are used to populate value range and value mask tables 28 and 26, which are subsequently used in derivation process 14.

Derivation process 14 receives data extracted from interim journal tables 30, main table 22, formula table 24, value mask table 26, and value range table 28 as input to derive the proper access code for each job or unit of work. Journal tables 32 updated with the derived access code are then provided as output. Journal tables 32 updated with the proper access codes are then used for billing and charge-back by accounting system 15. That is, the accounting system 15 includes a billing portion or subsystem 40, which uses information from the updated journal tables 32, including the access codes, to generate customer bills, one of which is shown diagrammatically at 42. The bill 42 is not a part of the accounting system 15, and is therefore shown in broken lines in FIG. 1.

Figure 2:
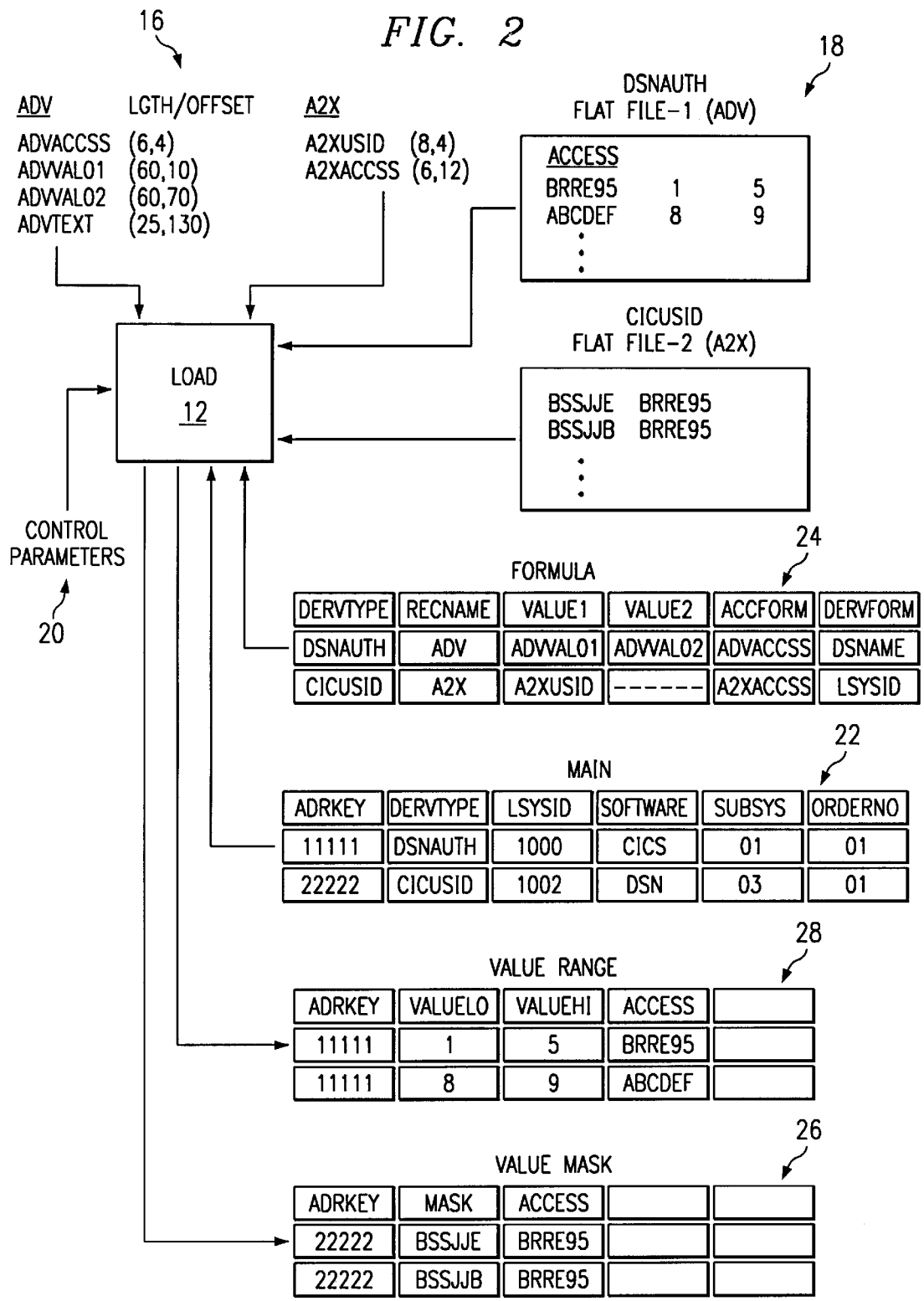
FIG. 2 is a more detailed block diagram of an embodiment of a load process or subsystem with its exemplary inputs.

Referring to FIG. 2, a more detailed block diagram of load process 12 is shown with exemplary inputs.

Set forth below are column definitions for selected exemplary columns in tables 22–28 containing exemplary inputs and other attributes. It is important to note that these tables may contain additional columns not listed or described herein to further aid in the load and derivation processes 12 and 14.

In Main Table 22:
ADRKEY - contains a system assigned value used for associating a row in main table 22 with a row containing corresponding values in value mask and/or range tables 26 and 28.
DERVTYPE - contains a value used to associate a row in main table 22 to row in formula table 24.
LSYSID - logical system identifier associated with the billing activity.
ORDERNO - a number specifying a priority in which the derivation formula identifier (DERVFORM) is applied.
SOFTWARE- specifies the software that generated the interim journal tables for billing purposes.
SUBSYS - subsystem identifier used to further identify the system consuming the resources.

In Formula Table 24:
ACCFORM - contains the formula used to obtain the access code for loading value mask and range tables 26 and 28.
DERVFORM- contains the formula used to identify the billing record field(s) in interim journal tables 30 for its value then used to compare with the value range (VALUELO and VALUEHI) and/or value mask (MASK) values.
DERVTYPE- contains a value used to associate a row in formula table 24 to row(s) main table 22.
RECNAME - contains the name of the record for which values for a particular DERVTYPE can be loaded by load process 12 in batch mode.
VALUE1 - contains the formula used to obtain the first of two values for use in load process 12, and can be the MASK value for value mask table 26 or the VALUELO value in value range table 28.
VALUE2 contains the formula used to obtain the second of two values for use in load process 12, which is VALUEHI in value range table 28.

In Value Mask Table 26:
ACCESS - contains the access code linking resource usage to a business unit for billing or charge-back purposes.
ADRKEY - contains a system assigned value used for associating a row in main table 22 with a row containing corresponding values in value mask and range tables 26 and 28.
MASK - contains the value to match with exactly or partially during derivation process 14 to derive the access code.

In Value Range Table 28:
ACCESS - contains the access code linking resource usage to a business unit for billing or charge-back purposes.
ADRKEY - contains a system assigned value used for associating a row in main table 22 with a row containing corresponding values in value mask and range table 28.
VALUELO- the low end of the range into which a value must fall to match during derivation process 14 to derive the access code.
VALUEHI- the high end of the range into which a value must fall to match during derivation process 14 to derive the access code.

Control parameters 20 are received as an input by load process 12 to identify which user-maintained flat file(s) 18 to use to load derivation information. Control parameters 20 may include example system attributes such as LSYSID (logical system ID), SUBSYS (subsystem), and SOFTWARE (the software that generated the billing records). Selected or all of these system attributes may be used to find one or more row entries in main table 22 to derive a corresponding DERVTYPE. For example, assume that the control parameters produced a match with DERVTYPE= 'DSNAUTH'. The DERVTYPE or 'DSNAUTH' from main table 22 is then used to find a row entry in formula table 24 with the same DERVTYPE. In the example shown in FIG. 2, the first row of formula table 24 has 'DSNAUTH' as the DERVTYPE. That same row also has 'ADV' as the RECNAME (record name), 'ADVVAL01' as VALUE1, 'ADVVAL02' as VALUE2, and 'ADVACCSS' as ACCFORM (access code formula). The ACCFORM value 'ADVACCSS' in formula table 24 is then used to find a match in control tables record 16 having ADV RECNAMEs. This is shown under the ADV heading as ADVACCSS (6,4), which represents the data length and offset in a predetermined unit, such as bytes, into an appropriate record in user-maintained flat files 18 to obtain the access code for the row entry in main table 22 marked with ADRKEY=11111 that will be stored in either the value mask table 26 or value range table 28. At offset 4 in user-maintained flat file 18 DSNAUTH record is the access code 'BRRE95'. Formula table 24 also includes VALUE1 and VALUE2, which have the values 'ADVVAL01' and 'ADVVAL02', respectively. When control tables 16 are searched, 'ADVVAL01' yields (60,10) and 'ADVVAL02' yields (60, 70) as the lengths and offsets for two numerical values '1' and '5' stored in flat files 18. Because VALUE2 has a value, the access code 'BRRE95' is entered into value range table 28 in the ACCESS column at row ADRKEY=11111 (matching main table row entry) because '1' and '5' indicate a range. The values '1' and '5' are also entered into value range table 28 in the same row as VALUELO and VALUEHI, respectively.

Using another example, assume that the control parameters entered by the user yielded the row with ADRKEY=22222 as a match. The DERVTYPE, 'CICUSID', is then used to find a match in formula table 24, which yields RECNAME='A2X', ACCFORM='A2XACCSS', and VALUE1='A2XUSID'. Note that VALUE2 does not have an entry. Looking in the control table records associated with RECNAME 'A2X' yields A2XUSID of data length 8 and at offset 4. Using the offset and data length information, the value 'BSSJJE' is obtained from an A2X record of user-maintained flat files 18. Further, the value 'BRRE9S' is also obtained from the same record using data length 6 and offset 12 information from control tables 16. Since only VALUE1 has a value, the formula is for a value mask, directing the selected access code 'BRRE95' and VALUE1 'BSSJJE' to be entered in value mask table 26 in columns ACCESS and MASK, respectively.

Operating in this manner, value range and mask tables 28 and 26 are populated during load process 12 according to the control parameter input. These tables, along with main and formula tables 22 and 24, are used in derivation process 14 to derive the access codes.

Figure 3:
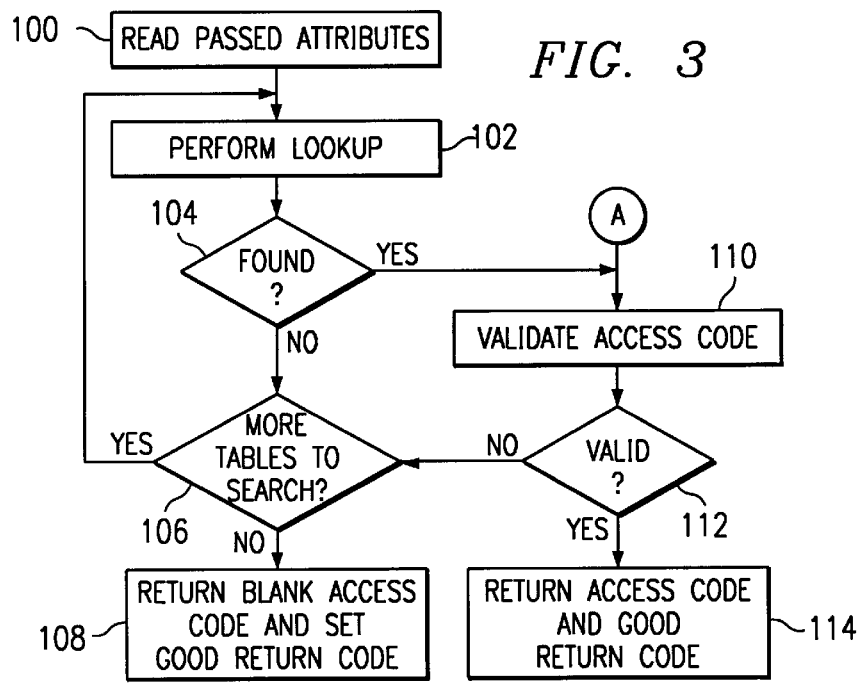
FIG. 3 is a simplified top-level flowchart of an embodiment of a derivation process or subsystem.

Referring to FIG. 3, which shows a top-level flowchart of an embodiment of derivation process 14 (FIG. 1), all or selected system attributes for a job or unit of work are extracted from interim journal tables 30 and passed to derivation process 14, as shown in block 100. An iterative lookup process is performed to find an exact match or a partial match of the passed system attributes in row entries of main table 22 to yield an associated access code, as shown in block 102. If no match is found at block 104, then at block 106 a check is made to see if there are more tables to be searched. If so, then execution returns to block 102 in order to continue searching. If a match is not found (as determined in block 104), and if there are no more tables to be searched, (as determined in block 106) then a blank access code is returned and a good return code variable is set to indicate that no valid access code is found. However, if an exact or partial match is found in block 104, then the associated access code is validated, as shown in block 110. If the access code is not valid as determined in block 112, execution returns to block 106 to search other tables, if any; otherwise if the access code is valid, it is returned along with the good return code, as shown in block 114.

The perform lookup process 102 is an iterative process that attempts to first find an exact match; if unsuccessful, it then proceeds with more generic and less specific values for the system attributes. Details of the lookup process is described in FIGS. 4–10.

Figure 4:
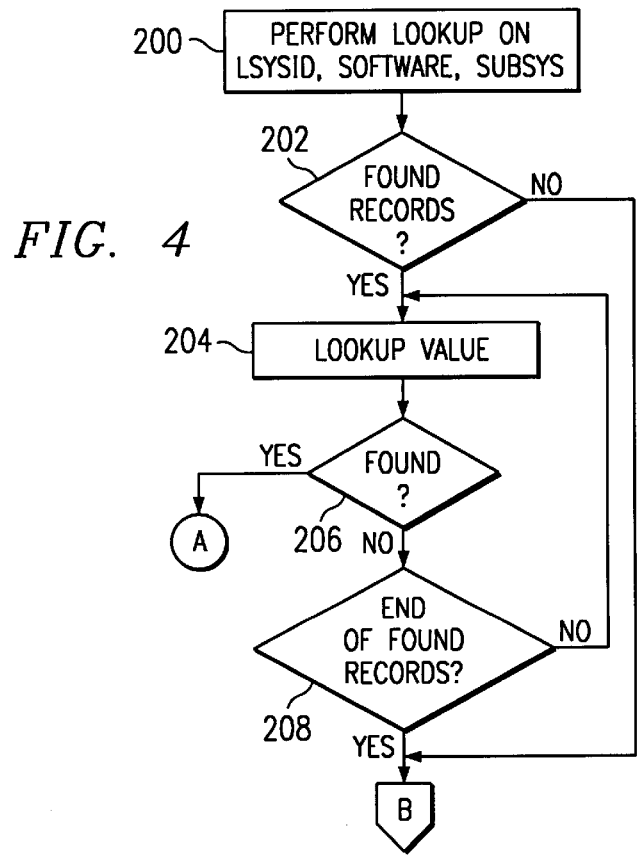
FIG. 4 is a simplified flowchart providing details on a lookup process.

Referring first to FIG. 4, block 200, a lookup is first performed with system attributes LSYSID, SOFTWARE, and SUBSYS, each with specific values as passed from interim journal tables 30 or billing records (FIG. 1). If one or more records are located in main table 22 that has the exact values as the passed attributes, as determined in block 202, then an access code value lookup is performed in block 204. Multiple records may have the same attribute values but are prioritized by the ORDERNO parameter (FIG. 2). Details of this process are shown in FIG. 10 and described below. If an access code is found (block 206), then execution returns to block 110 (FIG. 3) to validate the derived access code. If no access code is found, then subsequent records with matching attributes are also processed in a similar manner until none are left, as shown in block 208. In other words, if there are records with matching attributes which have not yet been processed, then execution proceeds from block 208 back to block 204, and remains in the loop which includes blocks 204–208 until all such records have been processed, or until an access code is found at block 206. When lookup using specific values of LSYSID, SOFTWARE, and SUBSYS does not produce a valid access code, less specific search attributes are used, as shown in FIGS. 5–9. That is, if it is ultimately determined at block 208 that all records have been processed, execution proceeds from block 208 to block 210 of FIG. 5, which is discussed below. If it had been determined at block 202 that there were no records with matching attributes, then execution would have proceeded directly from block 202 of FIG. 4 to block 210 of FIG. 5.

FIG. 5 shows a search with specific values for LSYSID and SOFTWARE paired with any value of SUBSYS. In other words, a match is produced with any record that has LSYSID and SOFTWARE matching the specified values thereof regardless of what value it has for SUBSYS (as shown in block 210). SUBSYS is allowed to be a wild card or "don't care". The process is much the same as shown in FIG. 4. Any found record is used to look up the access code, using priority established by ORDERNO, until all records with a match are processed, as shown in blocks 212–218.

In more detail, if it is determined at block 212 that no matching records have been found, execution proceeds directly to block 220 of FIG. 6, which is discussed later. However, if matching records are found, execution proceeds from block 212 to block 214, where an access code value lookup is performed. Multiple records may have the same attribute values, but are prioritized by the ORDERNO parameter. Execution then proceeds to block 216. If it is determined at block 216 that an access code has been found, then execution returns to block 110 of FIG. 3 to validate this access code. On the other hand, if no access code is found, then execution proceeds to block 218, where a check is made to see if there are any further records with matching attributes which have not yet been processed. If so, execution returns to block 214, and execution remains in the loop which includes blocks 214–218 until all records with matching attributes have been processed, or until an access code is found at block 216. In the event that all such records are processed without finding an access code at block 216, then execution proceeds from block 218 to block 220 of FIG. 6.

When a valid access code is still not produced, a lookup for records with a specific LSYSID but any value for SOFTWARE and SUBSYS is performed, as shown in block 220 in FIG. 6. Found records are also processed in a similar manner, as shown in block 222–228.

In more detail, if it is determined at block 222 that no matching records have been found, execution proceeds directly to block 230 of FIG. 7, which is discussed later. However, if matching records are found, execution proceeds from block 222 to block 224, where an access code value lookup is performed. Multiple records may have the same attribute values, but are prioritized by the ORDERNO parameter. Execution then proceeds to block 226. If it is determined at block 226 that an access code has been found, then execution returns to block 110 of FIG. 3 to validate this access code. On the other hand, if no access code is found, then execution proceeds to block 228, where a check is made to see if there are any further records with matching attributes which have not yet been processed. If so, execution returns to block 224, and execution remains in the loop which includes blocks 224–228 until all records with matching attributes have been processed, or until an access code is found at block 226. In the event that all such records are processed without finding an access code at block 226, then execution proceeds from block 228 to block 230 of FIG. 7.

If still no valid access code is produced, then records with any LSYSID but specific values for SOFTWARE and SUBSYS are searched for, as shown in block 230 of FIG. 7. Any records found that matched the specific values for SOFTWARE and SUBSYS are then processed in a similar manner as in blocks 232–238.

In more detail, if it is determined at block 232 that no matching records have been found, execution proceeds directly to block 240 of FIG. 8, which is discussed later. However, if matching records are found, execution proceeds from block 232 to block 234, where an access code value lookup is performed. Multiple records may have the same attribute values, but are prioritized by the ORDERNO parameter. Execution then proceeds to block 236. If it is determined at block 236 that an access code has been found, then execution returns to block 110 of FIG. 3 to validate this access code. On the other hand, if no access code is found, then execution proceeds to block 238, where a check is made to see if there are any further records with matching attributes which have not yet been processed. If so, execution returns to block 234, and execution remains in the loop which includes blocks 234–238 until all records with matching attributes have been processed, or until an access code is found at block 236. In the event that all such records are processed without finding an access code at block 236, then execution proceeds from block 238 to block 240 of FIG. 8.

A further search iteration shown in FIG. 8 performs lookup for records with a specific value for SOFTWARE and any value for LSYSID and SUBSYS, as shown in block 240. All records found with this search criteria are processed in blocks 242–248.

In more detail, if it is determined at block 242 that no matching records have been found, execution proceeds directly to block 250 of FIG. 9, which is discussed later. However, if matching records are found, execution proceeds from block 242 to block 244, where an access code value lookup is performed. Multiple records may have the same attribute values, but are prioritized by the ORDERNO parameter. Execution then proceeds to block 246. If it is determined at block 246 that an access code has been found, then execution returns to block 110 of FIG. 3 to validate this access code. On the other hand, if no access code is found, then execution proceeds to block 248, where a check is made to see if there are any further records with matching attributes which have not yet been processed. If so, execution returns to block 244, and execution remains in the loop which includes blocks 244–248 until all records with matching attributes have been processed, or until an access code is found at block 246. In the event that all such records are processed without finding an access code at block 246, then execution proceeds from block 248 to block 250 of FIG. 9.

Figure 9:
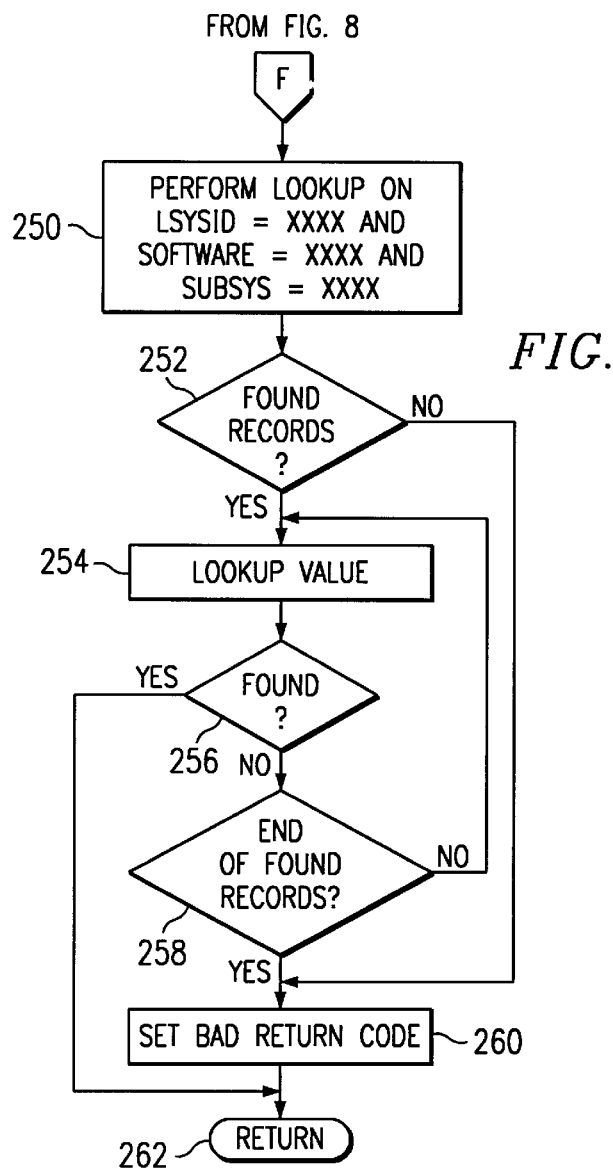
FIG. 9 is a simplified flowchart providing details on a lookup process.
Figure 10:
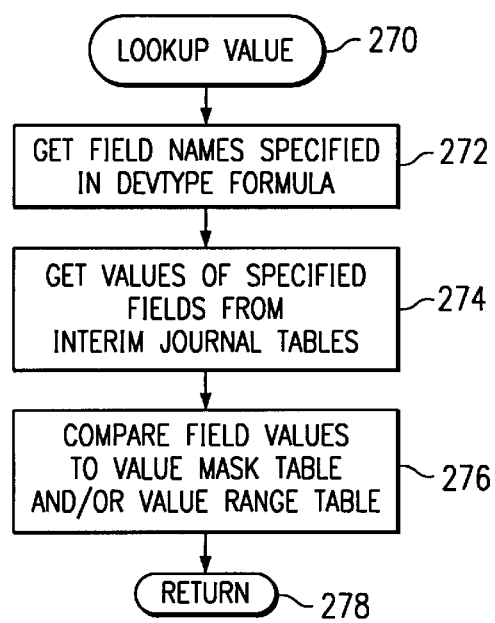
FIG. 10 is a simplified flowchart providing details on a lookup value process.

Finally, as shown in block 250 in FIG. 9, a lookup using wild cards or don't cares for all three attributes is performed. Found records are processed by looking up the associated access code(s) as shown in blocks 252–258. In more detail, if it is determined at block 252 that no matching records have been found, execution proceeds directly to block 260, which is discussed later. However, if matching records are found, execution proceeds from block 252 to block 254, where an access code value lookup is performed. Multiple records may have the same attribute values, but are prioritized by the ORDERNO parameter. Execution then proceeds to block 256. If it is determined at block 256 that an access code has been found, then execution returns through blocks 262 and 104 to block 110 of FIG. 3, in order to validate this access code. On the other hand, if no access code is found, then execution proceeds to block 258, where a check is made to see if there are any further records with matching attributes which have not yet been processed. If so, execution returns to block 254, and execution remains in the loop which includes blocks 254–258 until all records with matching attributes have been processed, or until an access code is found at block 256. If no valid access codes are found using the found records, then a bad return code is set and returned, as shown in blocks 260 and 262.

It may be seen from the foregoing that the lookup process is an iterative process that begins with the most specific search criteria to the least specific search criteria. Of those records that matched the search criteria, a priority established by ORDERNO identifies an order in which these records should be looked at to derive the access code.

FIG. 10 describes the process flow for looking up the access code (lookup value, block 270) using formula table 24, value mask table 26, and value range table 28 (FIG. 2). Using the associated value for DERVTYPE in the main table record to lookup a specific row in formula table 24, field name(s) specified by DERVFORM (derivation formula) associated with that DERVTYPE is identified, as shown in block 272. Note that main table 22 further include a column ORDERNO, which is used to establish a priority among DERVFORMS residing in rows with the same LSYSID, SOFTWARE, and SUBSYS values, so that the DERVTYPE of row with the lowest ORDERNO is used first to identify the field in the billing records in interim journal tables 30.

Using the specified field name(s) or DERVFORM from formula table 24, value(s) for the specified field(s) in interim journal tables 30 are read, as shown in block 274. DERVFORM may reference constant values or the following exemplary journal table columns:

1. SUBSYS (subsystem identifier)
2. WORKUNIT (work unit)
3. LSYSID (logical system identifier)
4. ACCESS (access code)
5. DSNAME (dataset name)
6. FIELDN (where N may be any interger value)
7. VOLSER (volume serial number)

Subsequently, as shown in block 276, the field values are compared with MASK in value mask table 26 and/or VALUELO and VALUEHI values in value range table 28. The MASK value in value mask table 26 may contain wild characters so that only a partial match is required. The match with VALUELO and VALUEHI in value range table 28 requires the field value to be within the range specified by VALUELO and VALUEHI. The access code contained in the row having the matching value range and/or value mask is then returned as the access code to use for the current billing record, as shown in block 278.

The flexibility of the instant system and method is imparted by the manner in which an operating center or site may specify the control parameters, value formula, value ranges and value masks, and derivation formula, all of which play a part in determining what the resultant access code is. An operating center is thus free to tailor its access code assignment to its unique business or data processing operations.

Although the present invention and its advantages have been described in detail, it should be understood that various changes, substitutions and alterations can be made therein without departing from the spirit and scope of the invention as defined by the appended claims.

What is claimed is:

1. A computer system for deriving access codes for billing customers, comprising:

a load subsystem receiving a set of system attributes and using at least one of said system attributes for looking up in at least one lookup table for an access code and at least one formula value, and storing said access code and at least one formula value in an access code lookup table;

a derivation subsystem receiving a specification of values for said set of system attributes from a billing record and using said specification of values for looking up in said at least one lookup table for a derivation formula, using said derivation formula for looking up in a billing record for an attribute value therefrom, using said attribute value for comparing with said formula value stored in said access code lookup table, and determining said access code associated with said formula value comparable to said attribute value; and a billing subsystem receiving information which includes said access code determined by said derivation subsystem for generating a bill.

2. The computer system, as set forth in claim 1, wherein said at least one formula value includes a value mask.

3. The computer system, as set forth in claim 1, wherein said at least one formula value includes a value mask containing a wild character string.

4. The computer system, as set forth in claim 1, wherein said at least one formula value includes two values indicative of a value range.

5. The computer system, as set forth in claim 1, wherein said set of system attributes includes a logical system identifier, a subsystem identifier, and an identification of a software which generated said billing record.

6. The computer system, as set forth in claim 1, wherein said derivation subsystem produces a billing record with said access code determined by said derivation subsystem inserted therein.

7. The computer system, as set forth in claim 1, wherein said at least one lookup table includes a main lookup table having said set of system attributes as column entries in addition to column entries of a lookup key.

8. The computer system, as set forth in claim 7, wherein said at least one lookup table includes a formula lookup table having said lookup key as a column entry in addition to column entries of an access code formula label, a derivation formula label, and at least one formula value label.

9. The computer system, as set forth in claim 8, further comprising:

a control parameters file containing a plurality of values for said set of system attributes specifying information about at least one system or device which performed a customer unit of work;

a plurality of user files each containing a plurality of access codes and associated at least one formula value; and a control table containing a location configuration of access codes and associated at least one formula value stored in said plurality of user files.

10. The computer system, as set forth in claim 9, wherein said load subsystem receives said set of system attributes and uses at least one of said system attributes for looking up in said main lookup table for a corresponding lookup key, uses said corresponding lookup key for looking up in said formula lookup table for a corresponding access code formula label and at least one formula value labels, further uses said access code formula label and at least one formula value label for looking up in said control table for a location of a corresponding access code and at least one formula value stored in said plurality of user files, and stores said obtained access code and at least one formula value in said access code lookup table.

11. The computer system, as set forth in claim 10, wherein said derivation subsystem receives a specification of values for said set of system attributes from a billing record and uses said specification of values for looking up in said main lookup table for said lookup key, uses said lookup key in said formula lookup table for looking up a corresponding derivation formula label, uses said derivation formula label for looking up in said billing record for an attribute value therefrom, uses said attribute value for comparing with said formula value stored in said access code lookup table, and determines said access code associated with said formula value comparable to said attribute value.

12. A computer system for deriving access codes for billing customers, comprising:

at least one lookup table;

a load subsystem receiving a set of system attributes and using at least one of said system attributes for looking up in said at least one lookup table for a corresponding lookup key, and using said corresponding lookup key for looking up in said at least one lookup table for a corresponding access code formula label and at least one formula value label, further using said access code formula label and at least one formula value label for looking up in said at least one lookup table for a location of a corresponding access code and at least one formula value stored in said plurality of user files, and storing said corresponding access code and at least one formula value in said at least one lookup table;

a derivation subsystem receiving a specification of values for said set of system attributes from a billing record and using said specification of values for looking up in said at least one lookup table for said lookup key, using said lookup key for looking up in said at least one lookup table for a corresponding derivation formula label, using said derivation formula label for looking up in a billing record for an attribute value, using said attribute value for comparing with said formula value stored in said at least one lookup table, and determining said access code associated with said formula value comparable to said obtained attribute value; and a billing subsystem receiving information which includes said access code determined by said derivation subsystem for generating a bill.

13. The computer system, as set forth in claim 12, wherein said at least one lookup table comprises a control parameters file containing a plurality of values for said set of system attributes specifying information about at least one system or device which performed a customer unit of work.

14. The computer system, as set forth in claim 12, wherein said at least one lookup table comprises a plurality of user files each containing a plurality of access codes and associated at least one formula values.

15. The computer system, as set forth in claim 12, wherein said at least one lookup table comprises a control table containing a location configuration of access codes and associated at least one formula values stored in said plurality of user files.

16. The computer system, as set forth in claim 12, wherein said at least one formula value includes a value mask.

17. The computer system, as set forth in claim 12, wherein said at least one formula value includes a value mask containing a wild character string.

18. The computer system, as set forth in claim 12, wherein said at least one formula value includes two values indicative of a value range.

19. The computer system, as set forth in claim 12, wherein said set of system attributes includes a logical system identifier, a subsystem identifier, and an identification of a software which generated said billing record.

20. The computer system, as set forth in claim 12, wherein said derivation subsystem produces a billing record with said access code determined by said derivation subsystem inserted therein.

21. The computer system, as set forth in claim 12, wherein said at least one lookup table comprises a main lookup table having said set of system attributes as column entries in addition to column entries of a lookup key.

22. The computer system, as set forth in claim 21, wherein said at least one lookup table comprises a formula lookup table having said lookup key as a column entry in addition to column entries of an access code formula label, a derivation formula label, and at least one formula value label.

23. A method for deriving access codes for billing customers, comprising the steps of:
   (a) receiving a set of system attributes and using at least one of said system attributes for looking up in at least one lookup table for an access code and at least one formula value;
   (b) storing said access code and at least one formula value in an access code lookup table;
   (c) receiving a specification of values for said set of system attributes from a billing record;
   (d) using said specification of values for looking up in said at least one lookup table for a derivation formula;
   (e) using said derivation formula for looking up in said billing record for an attribute value;
   (f) using said attribute value for comparing with said formula value stored in said access code lookup table;
   (g) identifying said access code associated with said formula value comparable to said attribute value; and
   (h) using information which includes said identified access code for generating a bill.

24. The method, as set forth in claim 23, wherein said steps (a) through (b) are performed by a load process, and said steps (c) through (g) are performed by a derivation process, said load and derivation processes being executed independently.

25. The method, as set forth in claim 23, wherein said step of receiving said set of system attributes includes the step of receiving a logical system identifier, a subsystem identifier, and an identification of a software which generated said billing record.

26. The method, as set forth in claim 23, further comprising the step of producing a billing record with said identified access code inserted therein.

27. The method, as set forth in claim 23, wherein said step (a) further comprises the steps of:
   using at least one of said system attributes for looking up in a main lookup table for a corresponding lookup key;
   using said lookup key for looking up in a formula lookup table for a corresponding access code formula label and at least one formula value label; and
   using said access code formula label and at least one formula value label for looking up in a control table for a location of a corresponding access code and at least one formula value stored in a plurality of user files.

28. The method, as set forth in claim 27, wherein said step (d) further comprises the steps of:
   using said specification of values for looking up in said main lookup table for said lookup key; and
   using said lookup key in said formula lookup table for looking up a corresponding derivation formula label.

29. The method, as set forth in claim 27, wherein said step of looking up in a control table includes the step of looking up at least one value mask.

30. The method, as set forth in claim 27, wherein said step of looking up in a control table includes the step of looking up at least one value mask containing a wild character string.

31. The method, as set forth in claim 29, wherein said step of looking up in a control table includes the step of looking up two values indicative of a value range.

32. The method, as set forth in claim 27, wherein said step of receiving a specification of values for said set of system attributes includes the step of receiving a specification of values for a logical system identifier, a subsystem identifier, and an identification of a software which said billing records.

* * * * *